July 29, 1969 — J. L. ZAR — 3,458,842

SUPERCONDUCTING MAGNET HAVING DUAL CONDUCTORS FORMING THE TURNS THEREOF

Filed June 19, 1967

JACOB L. ZAR
INVENTOR.

BY Charles M. Hogan
Melvin E. Frederick
ATTORNEYS

United States Patent Office 3,458,842

Patented July 29, 1969

3,458,842

SUPERCONDUCTING MAGNET HAVING DUAL CONDUCTORS FORMING THE TURNS THEREOF

Jacob L. Zar, North Andover, Mass., assignor to Avco Corporation, Cincinnati, Ohio, a corporation of Delaware Filed June 19, 1967, Ser. No. 647,096

Int. Cl. H01f *7/22, 1/00*

U.S. Cl. 335—216 1 Claim

ABSTRACT OF THE DISCLOSURE

A superconducting magnet having improved start-up characteristics wherein the magnet coil is wound with two superconductive ribbons in physical contact one over the other, each turn and each layer of the coil being electrically insulated from every other turn.

Superconducting devices have opened a whole exciting new field of vast practical and theoretical importance. Superconductivity is the property of certain materials, at temperatures approaching absolute zero, to carry current without power dissipation. Such materials, at temperatures below a certain critical temperaure, $T_e$, have no electrical resistivity, and therefore have no $I^2R$ losses. This phenomenon has been experimentally verified. Coils of such materials in liquid helium baths, with currents induced by withdrawing a permanent magnet from a position within the coil, have carried the resulting currents for periods of two years without any voltage drop. The factors controlling superconductivity of such materials are the interrelation of magnetic field strength H, critical current density $J_c$, and critical temperature $T_e$. The magnetic field strength, applied externally or generated by a current in the superconductor, limits superconductivity to below certain temperatures and current densities. Similarly, at a given field strength, an increase in temperature and/or current density can destroy superconductivity.

The large current-carrying capacity of superconductors provides the basis for very compact, superpowerful magnets which can be used in numerous applications where strong magnetic fields are required, for example, in lasers, masers, accelerators, and bubble chambers. It is calculated that the capital cost of a particular installation using such a magnet in place of a conventional electromagnet would be a factor of 100 less, and that the operating cost would be a factor of 80,000 less, due to the smaller physical size and the absence of power consumption or heat dissipation requirements for the magnet itself.

The phenomenon of superconductivity and the potential promise of superconducting materials is well known in the art (see, for example, Time magazine, March 3, 1961, p. 52, and Low Temperature Physics, Simon et al., Academic Press, pp. 95–132). A number of superconducting materials are known to the art, for example, $Nb_3Sn$, Nb-Ti, and Nb-Zr alloy. See also U.S. Patent 2,866,842.

In winding electromagnets with ribbon-type or flat conductors, one cannot normally achieve a high current density if provisions are made for internal cooling passages. Thus, in the absence of cooling passages, liquid helium cannot come in contact with the superconductor and, accordingly, the superconductor is not used in a stable condition.

Electromagnets wound with superconducting ribbon-type conductors without provision of internal cooling passages are subject to flux jumps that characteristically occur at fields that are considerably below the maximum field capability of the superconductor. For example, with commercially available $Nb_3Sn$ superconducting type ribbon, flux jumps occur at fields below about 50 kg. and unless special precautions are taken, a coil wound with such ribbon-type conductor will generally not achieve high fields because of the tendency of flux jumps to drive them normal.

Broadly, there are at present two techniques that are usually employed to permit both high field coils and high current density. The first of these techniques is to place an $Nb_3Sn$ coil inside a biased field of another superconducting coil wound, for example, with a niobium-titanium conductor, and energize the $Nb_3Sn$ coil only at field strengths above 50 kg. This procedure minimizes the possibility of flux jumps and, in fact, it will be observed that the maximum current carried by a coil in a bias field increases with the field, and finally, reaches the full H–I curve current value at around 100 to 120 kg. The rather significant disadvantage to this technique, in addition to volumetric limitations, is that the problem of low current density and/or lack of stabilization is merely transferred from the working coil to another part of the coil system.

The second technique is to short circuit each and every turn of the coil in several places by introducing short circuit bars within each layer of the winding. The short circuits provided by these short circuit bars provide alternate current paths around normal regions caused by flux jumps and thus allows the current to be reabsorbed by the superconductor without significant loss in coil energy when the flux jump disappears. In this manner, charging can proceed until finally high fields are obtained. The disadvantage with this technique is that the short circuited turns result in eddy current losses during the charging process. Further, a coil wound with short circuit bars must be charged slowly. If the charging is carried out at as rapid a rate as is possible with the present invention, this merely causes wasted energy in the form of eddy currents in the short circuited turns, and, accordingly, increases helium boil-off. Even small coils with short circuit bars typically require about one-half hour for charging. Thus, where charging times of one-half hour would be appropriate for even small prior art coils, coils wound in accordance with the invention can be charged in a matter of seconds. In accordance with the principle of the present invention, the above-mentioned disadvantages and limitations can be substantially minimized if not completely eliminated.

Another object of the present invention is to provide an improved superconducting device.

Another object of the present invention is to provide an improved method of making superconducting devices.

A further object of the present invention is the provision of an improved superconducting magnet and method of forming same with ribbon-type superconductive conductors wherein the magnet is characterized by a rapid start-up time.

The novel features that are considered characteristic of the invention are set forth in the appended claims; the invention itself, however, both as to its organization and method of operation together with additional objects and advantages thereof, will best be understood from the following description of a specific embodiment when read in conjunction with the accompanying drawings, in which:

Figure 1:
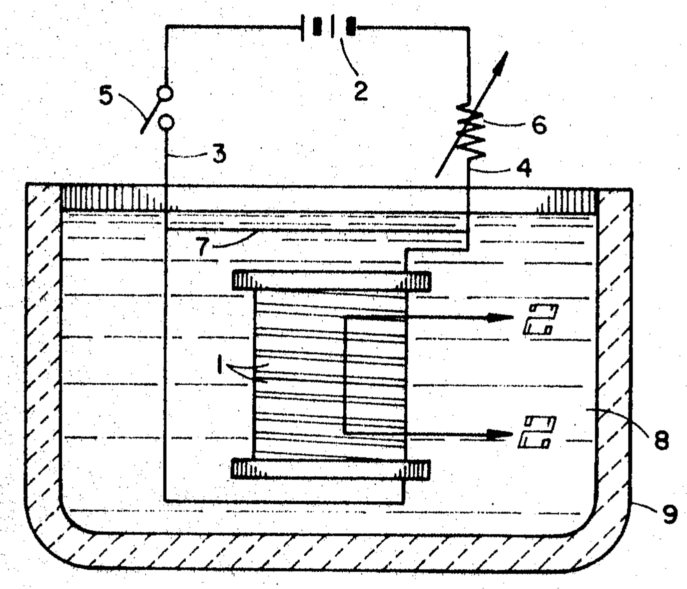
FIGURE 1 is a front elevation of a superconducting magnet in accordance with the invention.

Referring now to FIGURE 1, there is shown a superconducting electromagnet utilizing a dual conductor in accordance with the invention. The dual conductor 1 is connected to an external power source such as battery 2 by means of leads 3 and 4, switch 5 and variable resistor 6. Variable resistor 6 permits the current from the power source 2 to conductor 1 to be varied. Leads 3 and 4 may be connected by a shunt 7. Conductor 1 and shunt 7 are suspended in a low temperature environment 8 such as liquid helium. Typically, the low temperature environment is maintained in a Dewar flask 9. The conductor 1 is formed of superconducting material in ribbon form more fully described hereinafter.

Figure 2:
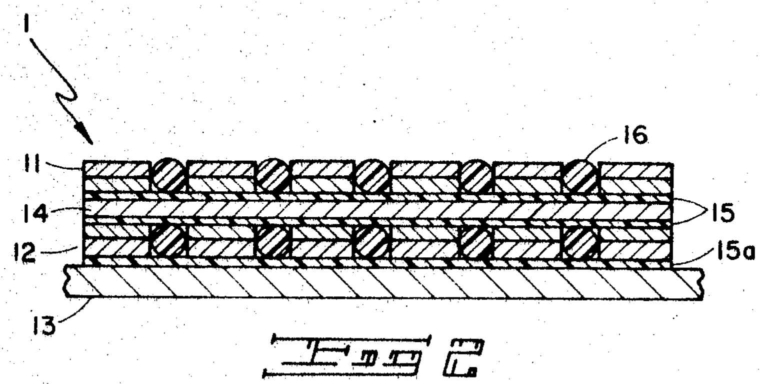
FIGURE 2 is a section taken on line 2—2 of FIGURE 1 showing details of the invention.

As seen in FIGURE 2, the superconducting conductor is wound in a plurality of layers 11 and 12 around a form 13 (FIG. 1). Sheets 14 of a normal metal such as, for example, copper and coated on both sides with electrically nonconductive material 15 such as, for example, Mylar, are disposed between adjacent layers. The term "normal" as used herein in its conventional sense to define a nonsuperconductive material which ordinarily conducts electricity and has measurable electrical resistivity at cryogenic temperatures.

Adjacent turns within a given layer are insulated from each other by an electrically nonconductive monofilament 16 of nylon, Mylar, or the like. The monofilament which may be wound with the conductor acts as a spacer between turns of the superconducting ribbon.

Figure 3:
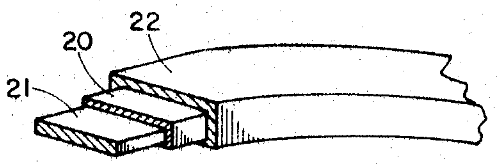
FIGURE 3 is a fragmentary view with parts broken away of a suitable ribbon-type superconductive conductor.

A suitable ribbon-type conductor is shown on a greatly enlarged scale in FIGURE 3. As shown in FIGURE 3, such a superconductive ribbon may comprise pure, single-phased, crystalline niobium-tin 20 ($Nb_3Sn$) vapor deposited on a flexible stainless-steel alloy ribbon substrate 21 and electroplated with silver 22. A suitable process for depositing $Nb_3Sn$ may comprise a high temperature process for depositing $Nb_3Sn$ on a moving ribbon by simultaneous hydrogen reduction of niobium-chloride and tin-chloride vapors to form pure $Nb_3Sn$. When cooled below its critical temperature (18° K.) the niobium-tin material becomes superconductive. Suitably prepared, $Nb_3Sn$ remains superconducting while supporting very large if not the largest current densities yet known at high magnetic fields. Such a conductor may typically have a thickness of 0.0052 inch and a width of 0.091 inch. A coil in accordance with the present invention is wound by placing two bare ribbon-type conductors, such as described and shown herein, one over the other, in intimate contact to define a dual conductor and winding the coil with this conductor in conventional manner. The first layer is of course insulated from the form 13 as by insulation **15*a* and the monofilament 16 wound in position as shown in FIGURE 2 simultaneously with the dual conductor to insulate adjacent turns from each other. Upon completion of a layer, the electrically conductive sheet 14** with its electrically nonconductive surfaces is disposed over the completed layer and winding of the next layer begun.

A specific example of one superconducting electromagnet made in accordance with the invention comprised 1520 turns of $Nb_3Sn$ superconductive ribbon as described hereinabove wound in the manner also described hereinabove on a 2-inch diameter form. The coil was charged in 10 seconds to 140 amperes and produced a field of 20 kg. It is significant to note that this coil had exactly the same current density distribution and was charged quickly, i.e., in 10 seconds as compared to typical previous current densities and charging times of one-half hour. Tests were also conducted to determine whether the charging time had any influence over the maximum current. As a result of these tests, it was determined that while there was a slight influence, for instance, at very slow charging times (of the order of 14 minutes) 165 amperes could be reached. However, with a charging time as short as 10 seconds, a current of 145 amperes was obtained. In view of this, it may be concluded that the influence of charging time is very slight.

It is believed that winding a coil with a dual ribbon conductor in accordance with the invention produces coils that can be rapidly charged whereas coils wound with a single or monolithic conductor cannot for the following reasons. The key to the problem of quick charging lies in getting through the low field region in the vicinity of 10 to 50 kg. where flux jumps occur. When a coil wound in conventional manner with a single strand of $Nb_3Sn$ ribbon conductor, for example, is subjected to a flux jump, a normal region occurs at the point of the flux jump and unless the current can be carried around this normal region heat is generated and the normal region grows.

The provision of a multiple (two or more) ribbon conductor in accordance with the invention, with the strands or ribbons wound tightly together in continuous and intimate contact, permits the current to transfer from one conductor to the other and thus get around a normal region as it occurs in one strand of the superconductors. In this manner, the dual conductors together help each other over the flux jumps and the coil rapidly reaches a high current capacity without going normal in the shortest possible time. The insulation 16 between turns and the non-short circuited interleaving material 14 eliminates eddy current losses. The interleaving material 14 also increases the heat conductivity within the coil so as to diffuse the energy liberated during flux jumps.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claim.

I claim:

1. In a superconducting electromagnet comprising a coil wound on a magnet form, the coil having a plurality of layers of elongated superconductive conductor means with each layer having a plurality of adjacent turns of said conductor means, wherein when the magnet is energized relative long charge times are required to achieve rated current flow in said conductor means, the improvement for decreasing said charging time comprising:

(a) means comprising a thin sheet of normal metal having good electrical conductivity and interposed between two thin layers of electrically nonconductive material separating said layers of superconductive conductor means to electrically insulate said layers one from another; and (b) means comprising monofilament of electrically non-conductive material wound between and separating said turns of said superconducting conductor means to electrically insulate said turns from each other, said superconductor means comprising separate at least first and second flat superconductive ribbon conductors in intimate, electrically conductive face to face contact, said first and second flat superconductive ribbon conductors each comprising a thin layer of superconductive material disposed on each of the opposite flat surfaces of a flexible metal substrate and a thin layer of normal metal disposed on and covering each of said layers of superconductive material.

(References on following page)

References Cited

UNITED STATES PATENTS

| | | | |
|---|---|---|---|
| 3,187,235 | 6/1965 | Berlincourt et al. | 335—216 |
| 3,352,008 | 11/1967 | Fairbanks | 335—216 XR |
| 3,363,207 | 1/1968 | Brechna | 335—216 |
| 3,366,728 | 1/1968 | Garwin et al. | 335—216 XR |

OTHER REFERENCES

The Review of Scientific Instruments, vol. 36, No. 6, June 1965, an article by Laverick, et al., pp. 825–830.

G. HARRIS, Primary Examiner

U.S. Cl. X.R.

174—128